US006349090B1

(12) United States Patent
Lewis et al.

(10) Patent No.: US 6,349,090 B1
(45) Date of Patent: Feb. 19, 2002

(54) TRAFFIC ROUTING IN A TELECOMMUNICATIONS NETWORK

(75) Inventors: Kevin Lewis, Herts (GB); Bertrund Gerard Christian Mace, Vertou (FR)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/043,765

(22) PCT Filed: Sep. 25, 1996

(86) PCT No.: PCT/GB96/02372

§ 371 Date: Jun. 1, 1998

§ 102(e) Date: Jun. 1, 1998

(87) PCT Pub. No.: WO97/12463

PCT Pub. Date: Apr. 3, 1997

(30) Foreign Application Priority Data

Sep. 26, 1995 (GB) .............................................. 9519613

(51) Int. Cl.$^7$ .............................................. G01R 31/08
(52) U.S. Cl. ..................... 370/238; 370/351; 370/400
(58) Field of Search ................................. 370/238, 254, 370/255, 256, 351, 389, 392, 400, 401; 709/238, 241

(56) References Cited

U.S. PATENT DOCUMENTS

| | | | | |
|---|---|---|---|---|
| 4,979,118 A | * | 12/1990 | Kheradpir | 701/117 |
| 5,072,379 A | * | 12/1991 | Eberhardt | 705/7 |
| 5,596,719 A | * | 1/1997 | Ramakrishnan et al. | 709/241 |

OTHER PUBLICATIONS

Gerla, et al., "Congestion Control In Interconnected LANs", IEEE Network: The Magazine of Computer Communications, vol. 2 (No. 1), p. 72–76, (Jan. 1, 1988).

Cain, et al., "'A Near Optimum' Multiple Path Routing for Space–Based SDI Networks", MILCOM '87, p. 578–584, (Oct. 25, 1987).

Albanese, et al., "A Routing Strategy For Interconnecting High–Speed Metropolitan Area Networks," ComputerCommunication Technologies for the 90's, p. 303–309, (Oct. 20, 1988).

Dixon, et al., "Addressing, Bridging and Source Routing", IEEE Network, vol. 2 (No. 1), p. 25–32, Jan. 25, 1998).

* cited by examiner

Primary Examiner—Chau Nguyen
Assistant Examiner—Inder Pal Mehra
(74) Attorney, Agent, or Firm—Lee, Mann, Smith, McWilliams, Sweeney & Ohlson

(57) ABSTRACT

In a telecommunications network comprising a plurality of nodes (N1, N2. . . ) interconnected by communications links (L1, L2. . . ) each incorporating one or more communications channels, traffic routing between network nodes is determined by providing a map or model of the network and determining in the model first and second nodes between which a communications path or route is to be established across the network. A set or colony of exploratory agents is created at the first node, and explores the model network via the links and nodes between the first and second nodes, each agent recording the results of its exploration. From this exploration, a route favoured by a significant number of the agents is determined and is set up on the telecommunications network.

7 Claims, 2 Drawing Sheets

TRAFFIC ROUTING IN A TELECOMMUNICATIONS NETWORK

This invention relates to the routing of telecommunications traffic in anetwork comprising a plurality of nodes interconnected by paths or links. In particular, the invention relates to a method and apparatus for operating a network by defining a traffic routing plan for such a network and to a method of routing traffic via the routing plan.

BACKGROUND OF THE INVENTION

As telecommunications networks become more complex and the traffic load increases there is a need to determine the routing of traffic within a network so as to provide efficient utilisation of communication channels used, and to minimise the total cost to the system operator. An approach to the problem of routing is described by A. Albanese et al. in "A Routing Strategy for Interconnecting High Speed Metropolitan Area Networks", Bell Communication Research Inc. An article entitled "Addressing, Bridging and Source Routing" by R C Dixon et a in IEEE Network Vol 2 No 1 January 1988 describes ways for a source to determine a route through local networks using a dynamic discovery procedure whereby possible paths to a target are explored by sending control frames throughout the network.

A particular problem that frequently confronts network operators is a business customer request to provide a number of permanent virtual circuits between two network nodes. To provide these circuits the operator must choose a route across the network which takes account of cost and of available bandwidth. At present, traffic routing is determined largely on an empirical basis as a full analysis of a complex network to obtain an analytical solution is an intractable problem. It is thus very difficult for an operator to ensure that a network is used with a high degree of efficiency under all traffic conditions.

SUMMARY OF THE INVENTION

An object of the present invention is to minimise or to overcome this disadvantage.

A further object of the invention is to provide an improved method of determining routing information in a telecommunications network.

According to one aspect of the invention there is provided a method of operating a telecommunications network whereby to determine traffic routing, said network comprising a plurality of nodes interconnected by communications links and each said link incorporating one or more communications channels, wherein the method includes, providing a map or model of the network, determining in the model first and second nodes between which a communications path or route comprising a chain of links is to be established across the network, allocating to each said link a cost value representative of the operational cost of that link, creating a set or colony of exploratory agents at said first node, permitting the agents at said first node to explore the model network via the links and nodes between said first and second nodes, determining for each said agent the nodes and links visited by that agent whereby to inhibit more than one traversal of a said link by that agent, recording the results of said exploration by providing on each traversed path a marker whose value relates to the total cost of the path and the number of agents selecting that path, and determining from said results a route favoured by a significant number of said agents and setting up said route on the telecommunications network, wherein each said agent arriving via a link at a network node selects a link by which to leave that node on a probability based choice weighted with the respective cost and marker values of the respective links whereby to select preferentially a link of lower cost.

According to another aspect of the invention there is provided apparatus for operating a telecommunications network whereby to determine traffic routing within the network, said network comprising a plurality of nodes interconnected by communications links and each said link incorporating one or more communications channels, wherein the apparatus includes, means for providing a map or model of the network, means for determining in the model first and second nodes between which a communications path or route comprising a chain of links is to be established across the network, means for allocating to each said link a cost value representative of the operational cost of that link, means for creating a set or colony of exploratory agents at said first node and for permitting the agents at said first node to explore the model network via the links and nodes between said first and second nodes, means for determining for each said agent the nodes and links visited by that agent whereby to inhibit more than one traversal of a said link by that agent, means for recording the results of said exploration by providing on each traversed path a marker whose value relates to the total cost of the path and the number of agents selecting that path, and means for determining from said results a route favoured by a significant number of said agents and setting up said route on the telecommunications network, wherein each said agent arriving via a link at a network node has means for selecting a link by which to leave that node on a probability based choice weighted with the respective cost and marker values of the respective links whereby to select preferentially a link of lower cost.

The exploratory agents are individually of very limited intelligence. Initially they explore the network selecting links based on the link cost, but as the search develops paths are found which are traversed preferentially by the agents. The process may be employed by a network operator to allocate circuits in response to customer requests.

The method is of particular application to ATM networks, but it is not of course limited to networks of this type.

BRIEF DESCRIPTION OF THE DRAWINGS

An embodiment of the invention will now be described with reference to the accompanying drawings in which.

DESCRIPTION OF PREFERRED EMBODIMENT

Figure 1:
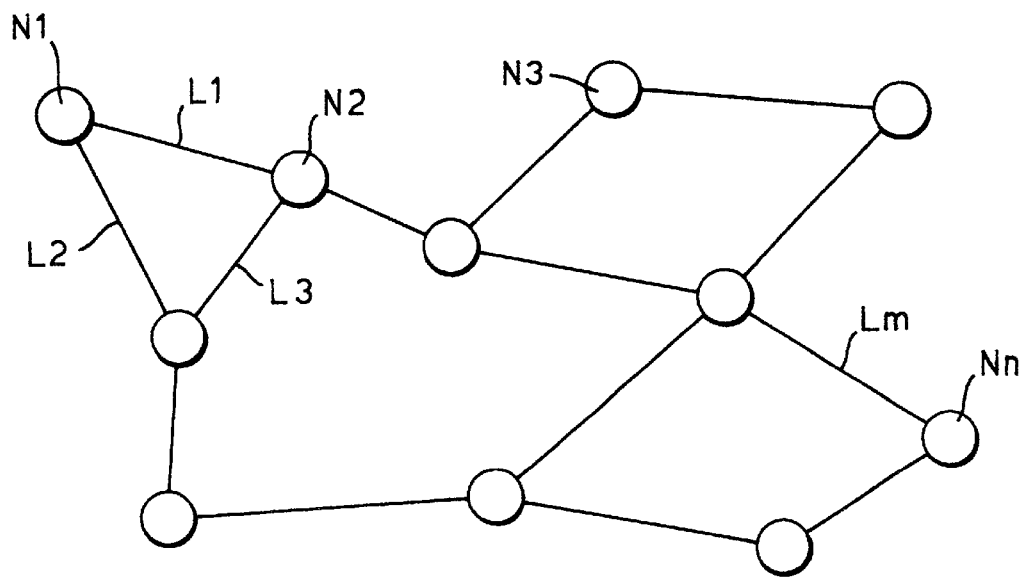
FIG. 1 is a schematic diagram of a telecommunications network comprising a plurality of nodes interconnected by links.

Referring to FIG. 1, the network comprises a number of nodes N1, N2 . . . Nn interconnected by communications link L1, L2 ... Lm. Each link has a respective capacity of a number of channels and also has a respective operating cost. Traffic between two network nodes is carried over a path comprising a set of links between those nodes and, in general, there will be a large number of possible paths between those nodes. For each path, the cost of that path is the total of the costs of each link comprising the path. It will be appreciated that for explanatory purposes, FIG. 1 shows a much simplified representation of the network which will normally comprise a large number of nodes and links.

The choice of a particular route between a pair of nodes will, in general, depend on considerations of the bandwidth required to accommodate the traffic and the cost to the network operator. However, when determining a route, i.e. selecting a series of links between selected nodes, existing traffic must also be considered to prevent the situation where some links have reached their full capacity whilst others are little used. This is generally referred to as load balancing.

A traffic routing path in the network of FIG. 1 is determined by the following process. A mode or map, i.e. a software model, of the network is prepared, each link of the model being allocated a bandwidth factor and a cost factor C determined from the real network. The end nodes of the derived path are identified and the bandwidth or the number of communications channels required to carry the traffic on the path are determined. In some applications the model may be simplified at this stage by deleting any links whose bandwidth is insufficient to carry the required traffic.

The next stage is the insertion of a set or colony of software exploratory agents at one of the end nodes of the path. These agents are simple devices having very little intelligence and which explore the network passing from node to node via the links therebetween until the destination node is reached. On this initial exploratory journey, the agents have the following characteristics.

1. Each time a link is traversed and each time a node is visited, the agent adds the identity of that link or node to a tabu list. This prevents a link being traversed or a node visited more than once and thus prevents closed loops or cycles within the path. The tabu list comprises an ordered search of the links. If an agent is unable to select a next link, then it backtracks to a node where further choices are possible.

2. When an agent arrives at a node it selects a link from those links leaving the node on an essentially random basis. I.e. if there are three links leaving that node the probability of selection of any one link based on the relative cost of the link. This probability selection is modified as the path search is developed as will be discussed below.

When an agent reaches the destination node it then returns to the originating node following the previously traversed links in reverse order as identified from its tabu list. As each link is traversed the agent leaves a volatile marker over the link, the value of that marker being inversely proportional to the total cost of the path. If more than one agent traverses a link then the values of their markers on that link are summed. The value of the marker may decay with time at a rate determined by the system operator. The technique ensures that the value of the marker on each link never becomes zero, as this will force random movement of the agents, according to the probability function below.

Figure 2:
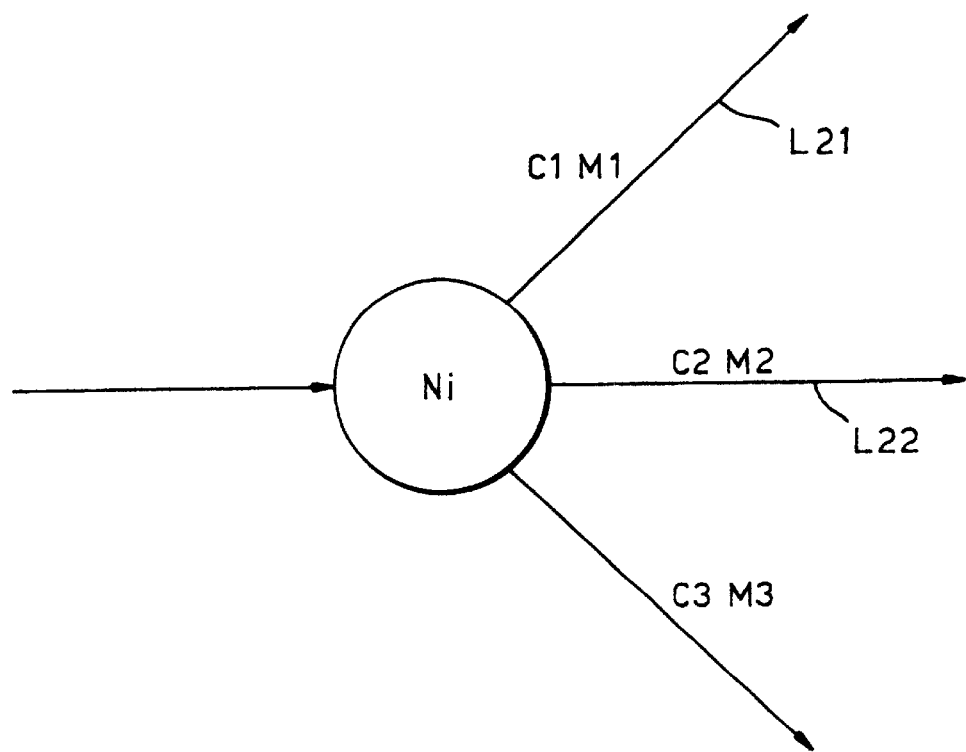
FIG. 2 shows further detail of a node of the network of FIG. 1.

At this stage of the search further exploratory agents arriving at the node Ni (FIG. 2) are presented with a number of links L2, L22 ... some or all of which carry various levels $M_i$ of the marker. Each of these links also carries a cost factor $C_i$. Selection of a link by which to leave the node and proceed to the next node is determined by the agent from a selection probability factor $P_i$ as defined below:

$$P_i = \frac{C_i^a M_i^b}{\sum_j C_j^a M_j^b}$$

where a represents the sensitivity of the agents to the cost of the link and b represents the sensitivity of the agents to the current level of the marker. This improves the results of the algorithm as this selection function acts as a greedy heuristic selecting the best solution. In this way, the lower cost paths will receive higher value markers and will this attract more and more new agents. The movement of the software agents from the source node following their insertion can be summarised by the following algorithm:

1. Find possible links with sufficient bandwidth.
2. Select one link based on probability factor.
3. Add link to tabu list.
4. Add link cost to total path cost.
5. Move along link to next node.
6. If next node=destination node, retrace path to originating node leaving marker. Stop on reaching originating node.
7. If next node ≠ destination node go to step 1.

When the emergence of a preferred path is detected, this path is then allocated by sending an allocator agent from the originating node along the path to the destination node. This agent checks each path link to confirm that it can be allocated to the path and reserves a bandwidth partition on the path. If an allocation error is detected, the agent deallocates the link and returns to the originating node to update the connection. Having determined a path from the model, this path can then be set up on the network by the operator.

Figure 3:
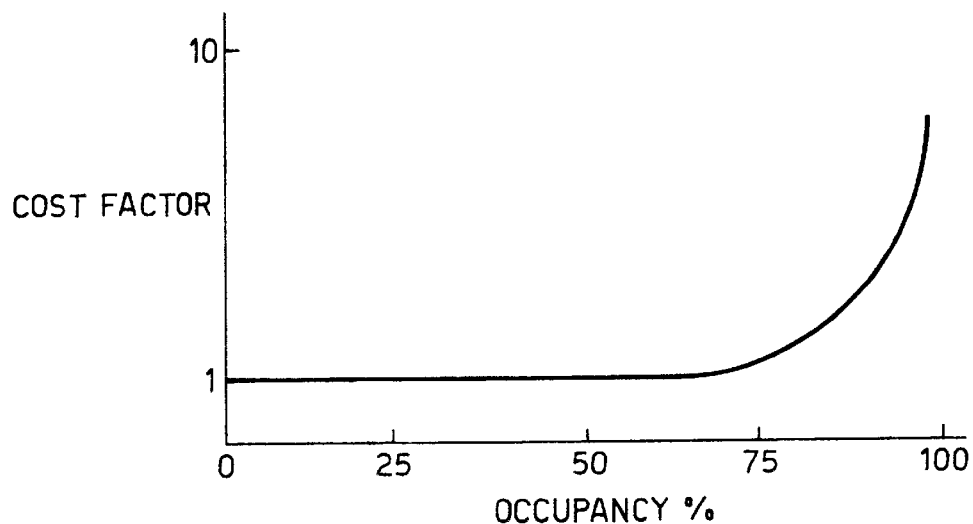
FIG. 3 illustrates a typical relationship between link occupancy and cost in the network of FIG. 1.

After a successful allocation of a path, the search process may be continued. At this point the available bandwidth on the allocated path will have been reduced by the allocation thus increasing its cost factor. This encourages the algorithm to seek alternative paths e.g. to identify a spare path that could be allocated in the event of a system fault, or to find a more cost effective path. In the latter event, the old path is deallocated and the new path becomes the allocated path In a development of the technique, the effective cost of a link may be adjusted by the operator to take account of the usage level or channel occupation of the link and thus effect load balancing within the network. Typically we provide a significantly increasing cost penalty for load levels exceeding about 75% occupancy. A typical relationship between occupancy and cost of a link is illustrated in FIG. 3.

Figure 4:
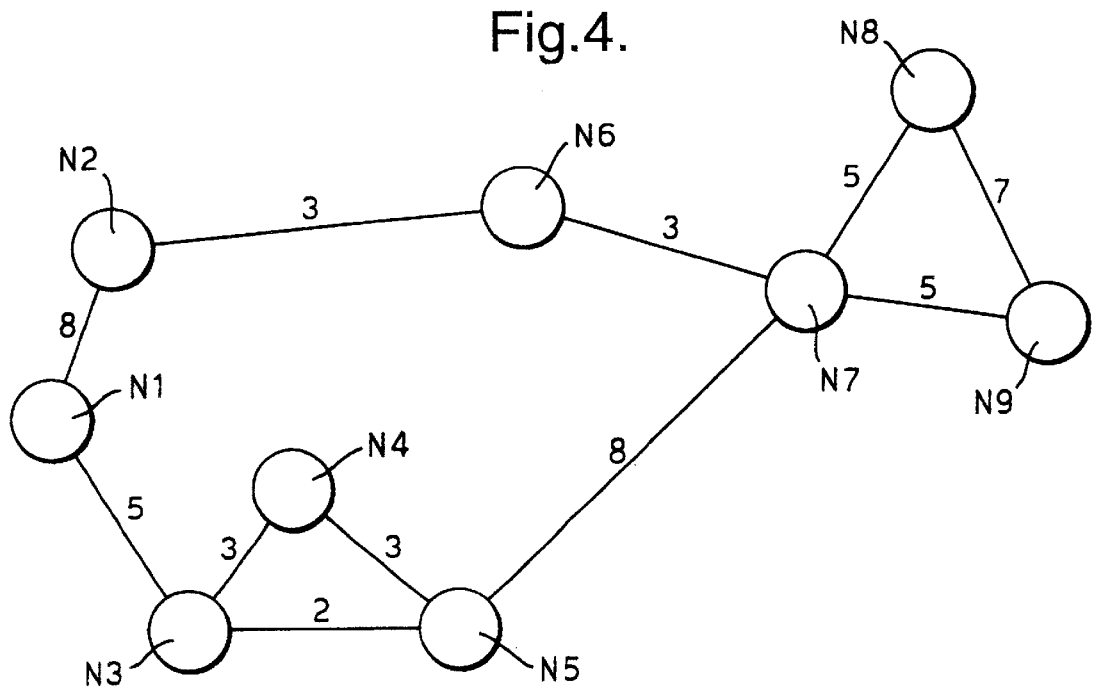
FIG. 4 shows a simple model network used for demonstration purposes.

To demonstrate the technique described above, we have applied the process to the analysis of a model network as shown in FIG. 4. In this network, each link is allocated a cost factor as indicated by a respective integer adjacent that link. The process was used with various values of a and with a fixed value of b to determine a route between the nodes N1 and N9. In each case the optimum route found after a number of iterations was N1-N2-N6-N7-N9. The results of these tests are summarised in Table 1 below which shows the minimum and maximum number of iterations required to find the route for each set of values of a and b.

TABLE 1

| a, b | a = 1, b = 2 | a = 2, b = 2 | a = 4, b = 2 | a = 10, b = 2 |
|---|---|---|---|---|
| Minimum | 90 | 90 | 140 | 140 |
| Maximum | 333 | 220 | 204 | 200 |
| Mean | 212.45 | 170.82 | 160 | 154.4 |
| Standard deviation | 44.38 | 24.3 | 13.25 | 10.7 |

We have found from the above results that the optimum value of a is between 2 and 4, as this provides a reasonably rapid solution without the risk that the process will lock into the first found solution and will ignore possible better solutions.

In a further development to the technique, two sets or colonies of software exploratory agents are inserted, one at each of the end nodes of the path. This development further improves the technique by eliminating local optima due to the structure of the network.

In another embodiment, the behaviour of the exploratory agents may be developed using a genetic algorithm technique which encourages the agents to seek new paths after an initial path has been found and thus avoid the risk of locking on to a local optimum solution. This is achieved by controlling the sensitivity of the agents to the marker and to the cost factor, when the initial set of agents is created, each agent is allocated cost and marker sensitivity parameters on a random basis. When an agent returns to the source node having discovered a path, its parameters are stored and linked to the cost of that path. This cost performs the role of a fitness function in the genetic algorithm. When new agents are created, the parameters of the recently returned agents are employed to generate an intermediate population of parameters. Also some random parameters are added to the population and the genetic operators such as mutation and crossover are carried out to provide a new set of parameters for the newly created agents. We have found that the introduction of the random parameters results in the exploration and exploitation of new paths thus increasing the probability of finding improved solutions.

In the above description, the route identifying algorithm has been described with particular reference to point to point routing. However it will be appreciated that it can be adapted for the determination of point to multipoint routing problems e.g. for applications such as distance learning where a single source node transmits information to and receives information from a number of destination nodes.

What is claimed is:

1. A method of operating a telecommunications network whereby to determine traffic routing, said network comprising a plurality of nodes interconnected by communications links and each said link incorporating one or more communications channels, wherein the method includes, providing a model of the network, determining in the model first and second nodes between which a communications path or route comprising a chain of links is to be established across the network, allocating to each said link a cost value representative of the operational cost of that link, creating a set or colony of exploratory agents at said first node, permitting the agents at said first node to explore the model network via the links and nodes between said first and second nodes, determining for each said agent the nodes and links visited by that agent whereby to inhibit more than one traversal of a said link by that agent, recording the results of exploration of the model network by providing on each traversed path a marker whose value relates to the total cost of the path and the number of agents selecting that path, and determining from said results a route favoured by a significant number of said agents and setting up said route on the telecommunications network, wherein each said agent arriving via a link at a network node selects a link by which to leave that node on a probability based choice weighted with the respective cost and marker values of the respective links whereby to select preferentially a link of lower cost.

2. A method as claimed in claim 1, wherein the marker has a value which is inversely proportional to the total cost associated with the traversed path.

3. A method as claimed in claim 2, wherein a further set of exploratory agents is created at said second node.

4. A method as claimed in claim 2, wherein said agents are created as successive generations, and wherein the response of said successive generations of agents to the cost of a link and the value of a marker on a path is developed via a genetic algorithm.

5. A method as claimed in any one of the preceding claims wherein the marker value decays with time.

6. Apparatus for operating a telecommunications network whereby to determine traffic routing within the network, said network comprising a plurality of nodes interconnected by communications links and each said link incorporating one or more communications channels, wherein the apparatus includes, means for providing a model of the network, means for determining in the model first and second nodes between which a communications path or route comprising a chain of links is to be established across the network, means for allocating to each said link a cost value representative of the operational cost of that link, means for creating a set or colony of exploratory agents at said first node and for permitting the agents at said first node to explore the model network via the links and nodes between said first and second nodes, means for determining for each said agent the nodes and links visited by that agent whereby to inhibit more than one traversal of a said link by that agent, means for recording the results of exploration of the model network by providing on each traversed path a marker whose value relates to the total cost of the path and the number of agents selecting that path, and means for determining from said results a route favoured by a significant number of said agents and setting up said route on the telecommunications network, wherein each said agent arriving via a link at a network node has means for selecting a link by which to leave that node on a probability based choice weighted with the respective cost and marker values of the respective links whereby to select preferentially a link of lower cost.

7. A method as claimed in claim 3, wherein said agents are created as successive generations, and wherein the response of said successive generations of agents to the cost of a link and the value of a marker on a path is developed via a genetic algorithm.

\* \* \* \* \*